(12) United States Patent
Tripp et al.

(10) Patent No.: US 10,919,666 B2
(45) Date of Patent: Feb. 16, 2021

(54) SLED CONFIGURED FOR SHIPPING VESSEL

(71) Applicant: Target Brands, Inc., Minneapolis, MN (US)

(72) Inventors: Michael R. Tripp, Minneapolis, MN (US); Slade A. Lewis, Cottage Grove, MN (US); Azariah J. Israel, Maple Grove, MN (US); Jeremy J. Gustin, Maple Grove, MN (US); Noah S. Paley, Albany, NY (US); Thomas E. McMillan, Farmington, MN (US); David J. Sales, Coon Rapids, MN (US); Michael G. Frank, Stony Point, NY (US); Sukie C. Ewald, Eden Prairie, MN (US); Max A. Kondrath, Campbell, CA (US); Carlos A. Loza, Sunnyvale, CA (US)

(73) Assignee: Target Brands, Inc., Minneapolis, MN (US)

( * ) Notice: Subject to any disclaimer, the term of this patent is extended or adjusted under 35 U.S.C. 154(b) by 158 days.

(21) Appl. No.: 16/248,067

(22) Filed: Jan. 15, 2019

(65) Prior Publication Data

US 2020/0223584 A1 Jul. 16, 2020

(51) Int. Cl.
*B62B 3/00* (2006.01)
*B65D 19/42* (2006.01)
*B66F 9/12* (2006.01)

(52) U.S. Cl.
CPC .............. *B65D 19/42* (2013.01); *B62B 3/002* (2013.01); *B66F 9/127* (2013.01)

(58) Field of Classification Search
CPC ................................. B62B 3/002; B62B 3/04
USPC .................... 280/79.4, 79.6, 43.12, 43.34
See application file for complete search history.

(56) References Cited

U.S. PATENT DOCUMENTS

| 2,536,561 | A | * | 1/1951 | Mickam | B62B 3/104 |
|---|---|---|---|---|---|
| | | | | | 414/480 |
| 3,016,973 | A | | 1/1962 | Williamson | |
| 3,101,128 | A | * | 8/1963 | Dane | B66F 9/127 |
| | | | | | 182/222 |
| 3,643,993 | A | * | 2/1972 | Asadurian | B65F 1/122 |
| | | | | | 294/68.26 |
| 3,889,833 | A | | 6/1975 | Thomas | |

(Continued)

FOREIGN PATENT DOCUMENTS

GB 2155431 A 9/1985

*Primary Examiner* — Jeffrey J Restifo
(74) *Attorney, Agent, or Firm* — Leanne Taveggia Farrell; Westman, Champlin & Koehler, P.A.

(57) ABSTRACT

A sled includes a deck having a top surface and a cradle section configured to hold a shipping vessel. The cradle section includes a length that extends from a back of the deck towards a front of the deck. First and second wedges extend at least the length of the cradle section and each include at least an outer facing surface and an upper facing surface. The outer facing surface of the first wedge defines a first side of the cradle section and the outer facing surface of the second wedge defines a second side of the cradle section. The upper facing surfaces of each of the first wedge and the second wedge is oriented at an angle relative to the top surface of the deck such that each upper facing surface of each wedge slopes downwardly from an outer edge to an opposing inner edge.

19 Claims, 10 Drawing Sheets

(56) References Cited

U.S. PATENT DOCUMENTS

| | | | | |
|---|---|---|---|---|
| 3,893,686 | A * | 7/1975 | Morgan | B62B 3/025 280/651 |
| 4,212,478 | A * | 7/1980 | McGrath, Jr. | B66F 9/18 248/129 |
| 4,290,730 | A * | 9/1981 | Weaver | B66F 9/12 105/462 |
| 4,383,398 | A * | 5/1983 | Tipton | B66F 9/127 156/577 |
| 5,096,018 | A * | 3/1992 | Dickinson, Jr. | B66F 9/127 182/222 |
| 5,161,933 | A * | 11/1992 | Stauber | B62B 3/04 280/43.12 |
| 5,709,520 | A * | 1/1998 | Pish | B60S 13/00 254/7 B |
| 6,152,264 | A * | 11/2000 | Gaines, Sr. | B66F 11/046 182/141 |
| 6,170,855 | B1 * | 1/2001 | Bianchetto | B62B 3/104 280/47.315 |
| 6,402,167 | B1 * | 6/2002 | Calleja | B62B 3/006 108/55.1 |
| 6,860,496 | B2 * | 3/2005 | Novak | B62B 5/049 211/20 |
| 7,322,586 | B1 * | 1/2008 | Zettel | B62B 1/18 280/47.24 |
| 7,549,654 | B2 * | 6/2009 | Anderson | B62B 3/006 211/85.24 |
| 8,257,008 | B2 | 9/2012 | Ellingson | |
| 8,360,459 | B2 * | 1/2013 | Holtan | B62B 5/0079 280/495 |
| 8,627,925 | B2 * | 1/2014 | Webster | E04G 5/144 182/113 |
| 8,651,237 | B2 * | 2/2014 | Pulliam | E02F 3/962 182/141 |
| 8,764,373 | B2 | 7/2014 | Bates | |
| 8,894,037 | B1 * | 11/2014 | Brauer | B65D 19/44 254/2 C |
| 9,089,728 | B2 * | 7/2015 | Halley | A62C 27/00 |
| 9,327,952 | B1 * | 5/2016 | Kolharkar | B66F 9/07 |
| 9,365,227 | B2 * | 6/2016 | Shegerian | B62B 3/004 |
| 10,035,689 | B2 | 7/2018 | Iotti | |
| 10,414,421 | B1 * | 9/2019 | Westmoreland | B62B 5/00 |
| 10,562,362 | B2 * | 2/2020 | Floyd | B60D 1/04 |
| 10,752,276 | B1 * | 8/2020 | Jordan | B62B 5/00 |
| 10,766,516 | B2 * | 9/2020 | Finstad | B62B 3/002 |
| 2007/0074935 | A1 * | 4/2007 | Zahn | B66F 9/07545 182/141 |
| 2007/0166142 | A1 * | 7/2007 | Sentenne | B66F 9/127 414/619 |
| 2008/0135506 | A1 * | 6/2008 | Peters | B65D 19/10 211/49.1 |
| 2011/0210023 | A1 * | 9/2011 | DeForest | B65D 19/08 206/304.2 |
| 2011/0303129 | A1 * | 12/2011 | Harris | A47B 87/0215 108/53.1 |
| 2015/0101956 | A1 * | 4/2015 | Dobrinski | B65D 19/02 206/591 |
| 2016/0244263 | A1 | 8/2016 | Kolharkar et al. | |

\* cited by examiner

SLED CONFIGURED FOR SHIPPING VESSEL

BACKGROUND

Retailers participate in supply chain management and logistics to control product quality, inventory levels, timing and expenses. As retail companies become more involved in digital purchases and shipments of merchandise, they must concentrate more on managing their supply chain and logistics. The supply chain for a retailer includes all of the contributors involved in getting merchandise into the hands of customers and guests. Logistics is the moving and storing of goods including shipping and warehousing.

The discussion above is merely provided for general background information and is not intended to be used as an aid in determining the scope of the claimed subject matter.

SUMMARY

A sled is configured to hold a shipping vessel and includes a deck having a top surface and a cradle section configured to hold the shipping vessel. The cradle section includes a length that extends from a back of the deck towards a front of the deck. A first wedge extends at least the length of the cradle section and includes at least an outer facing surface and an upper facing surface. The outer facing surface of the first wedge defines a first side of the cradle section of the sled. A second wedge is spaced apart from the first wedge, extends at least the length of the cradle section and includes at least an outer facing surface and an upper facing surface. The outer facing surface of the second wedge defines a second side of the cradle section of the sled. The upper facing surface of the first wedge is oriented at an angle relative to the top surface of the deck such that the upper facing surface of the first wedge slopes downwardly from an outer edge of the upper facing surface of the first wedge to an opposing inner edge of the upper facing surface of the first wedge. The upper facing surface of the second wedge is oriented at an angle relative to the top surface of the deck such that the upper facing surface of the second wedge slopes downwardly from an outer edge of the upper facing surface of the second wedge to an opposing inner edge of the upper facing surface of the second wedge.

A sled is configured to hold a shipping vessel and includes a deck having a top surface and a cradle section configured to hold the shipping vessel. The cradle section includes a length that extends from a back of the deck towards a front of the deck. A first back wall defines a portion of a back of the cradle section. A second back wall spaced apart from the first back wall defines a portion of the back of the cradle section. A top of the first back wall is oriented at an angle relative to the top surface of the deck such that an outer portion is located a distance from the top surface of the deck that is greater than a distance that an opposing inner portion is located from the top surface of the deck. A top of the second back wall is oriented at an angle relative to the top surface of the deck such that an outer portion is located a distance from the top surface of the deck that is greater than distance that an opposing inner portion is located from the top surface of the deck.

A method of using a sled to pick and place inventory includes carrying, using forks of a forklift, a shipping vessel to the sled. The sled includes two back walls spaced apart from each other for accommodating the forks of the forklift and a pair of wedges are each located on opposing sides of a deck of the sled. Using forks on the forklift, the shipping vessel is placed on the deck of the sled. The pair of wedges guide the shipping vessel so the shipping vessel is centered on the deck. The sled including the shipping vessel is attached to an order picker and using the order picker, the sled including the shipping vessel is lifted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

A retail store warehouse is a commercial building that stores retail goods before further distribution. A retail store warehouse usually has loading docks to load and unload inventory from trucks, often has cranes and forklifts for moving the inventory, which are usually placed on pallets, and storage racks for storing the inventory. A retailer predominantly runs a piece-pick operation where order selection processes are picked and handled in individual units and placed in another container before distribution from the warehouse. For Internet retailers, this may mean order picking from the retail goods stored in the warehouse and shipping the order directly to the customer. For brick and mortar retailers, it may mean order picking retail goods from the warehouse that are in low quantity at the store and transporting the order directly to the store for eventual placement on a shelf for display. In either scenario, goods stored at a warehouse need to be easily available on an individual basis and not in bulk.

Warehousing efficiencies and safety may be lost in retail warehouse processing systems where multiple touches of the retail goods or non-ergonomic moves are needed to get the retail goods to their storage location, to get the retail good from their stored location to the sales floor or to get the retail goods from their stored location into the hands of the customers. In some instances, retail goods are transported in a shipping vessel, such as a pallet box, that includes a platform with forklift slots on its underside, side walls and a lid. For example, in a trailer truck, the shipping vessels may be stacked on top of each other to fill the entire truck volume. In a warehousing example, after the shipping vessel comes off the trailer and in accordance with various embodiments described herein, the shipping vessel may be cradled in a sled that is configured to hold the shipping vessel. The sled moves the shipping vessel from place to place around the floor of the warehouse as well as provides features for ergonomically and safely moving the shipping vessel vertically into the air from the floor.

Figure 1:
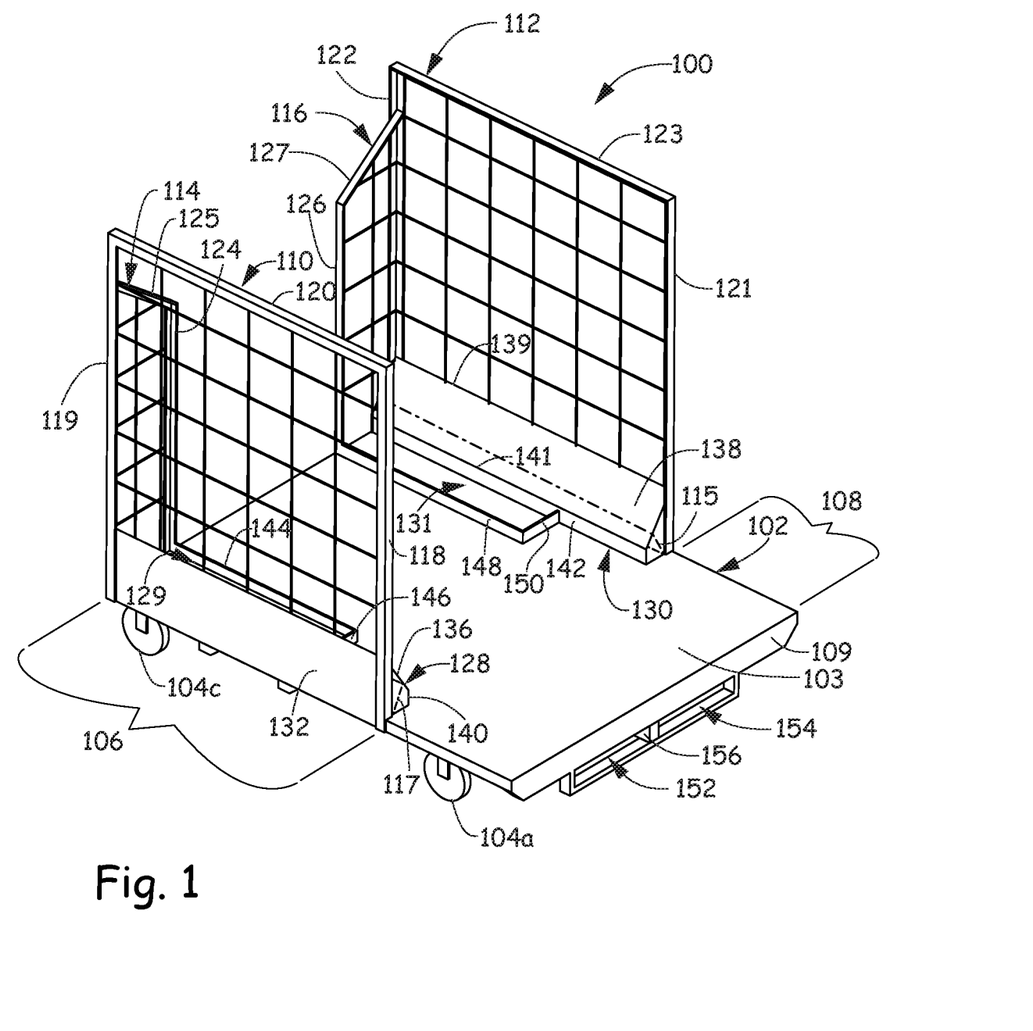
FIG. 1 a front perspective view of a sled configured to hold a shipping vessel.
Figure 2:
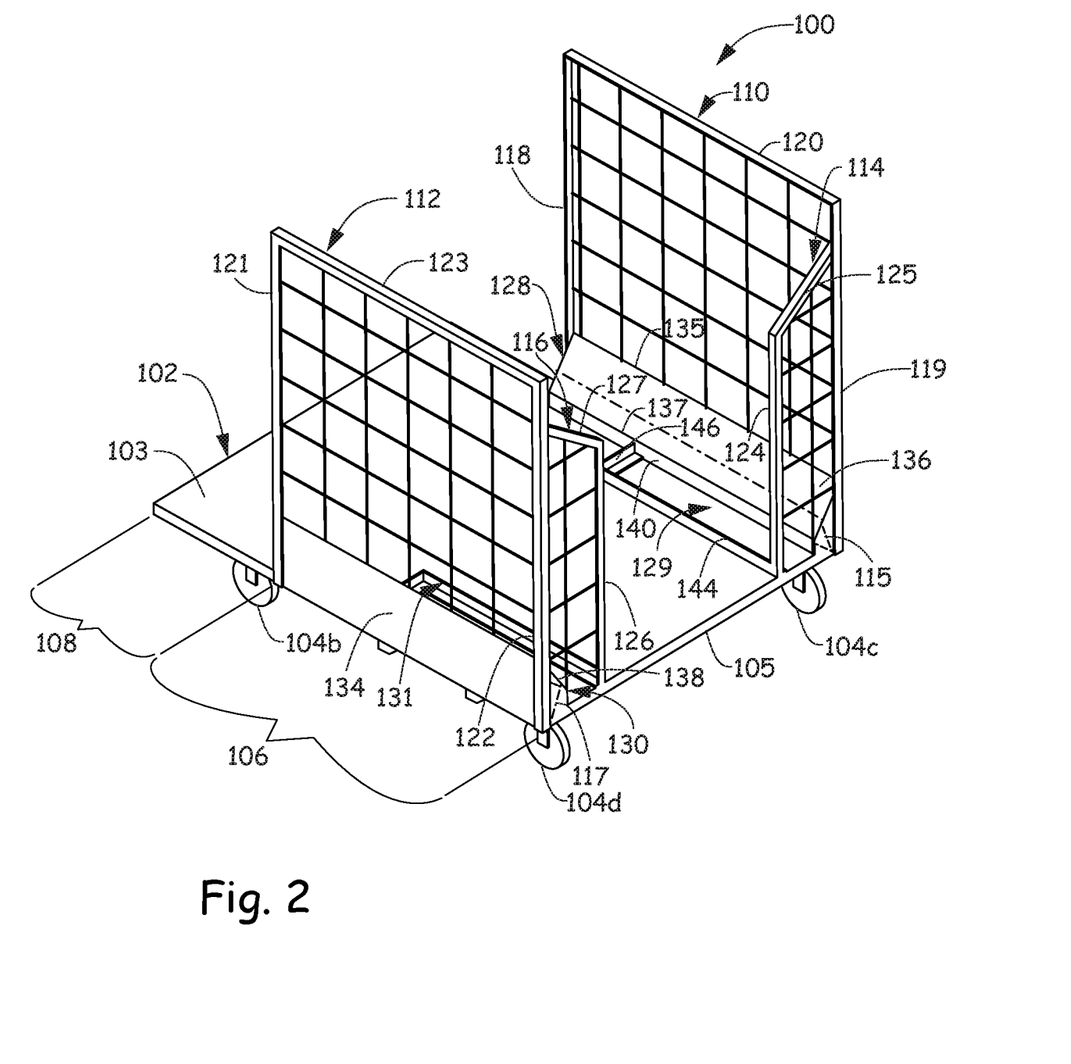
FIG. 2 is a back perspective view of FIG. 1.
Figure 3:
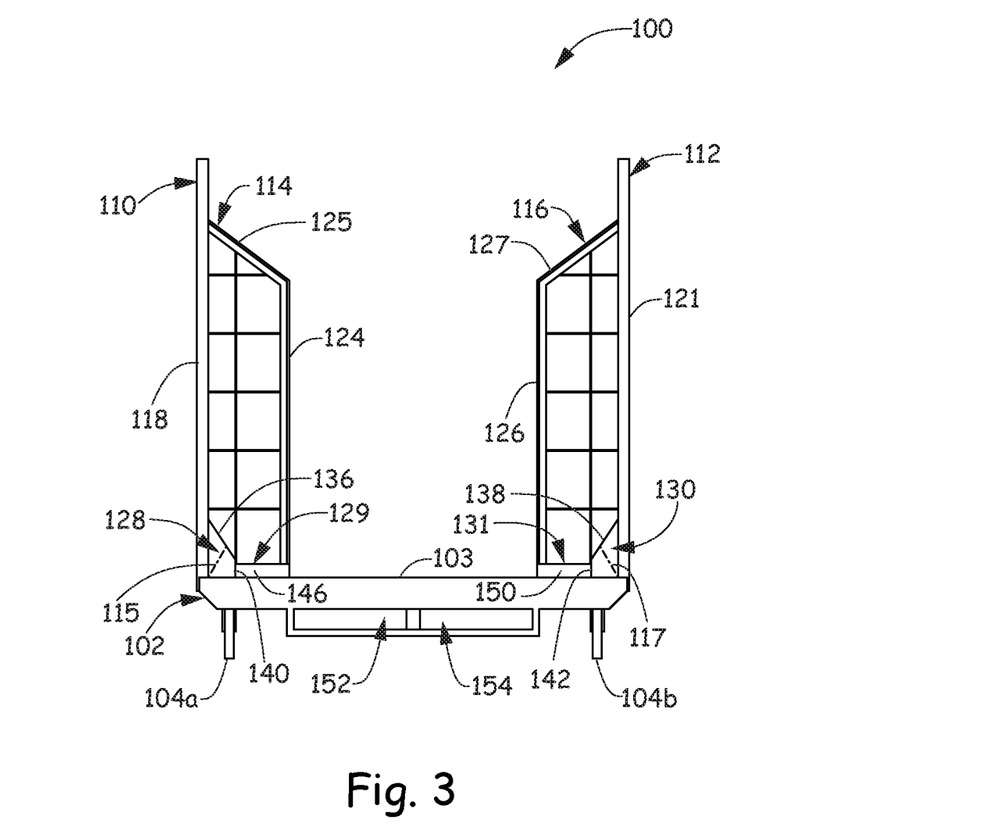
FIG. 3 is a front view of FIG. 1.
Figure 4:
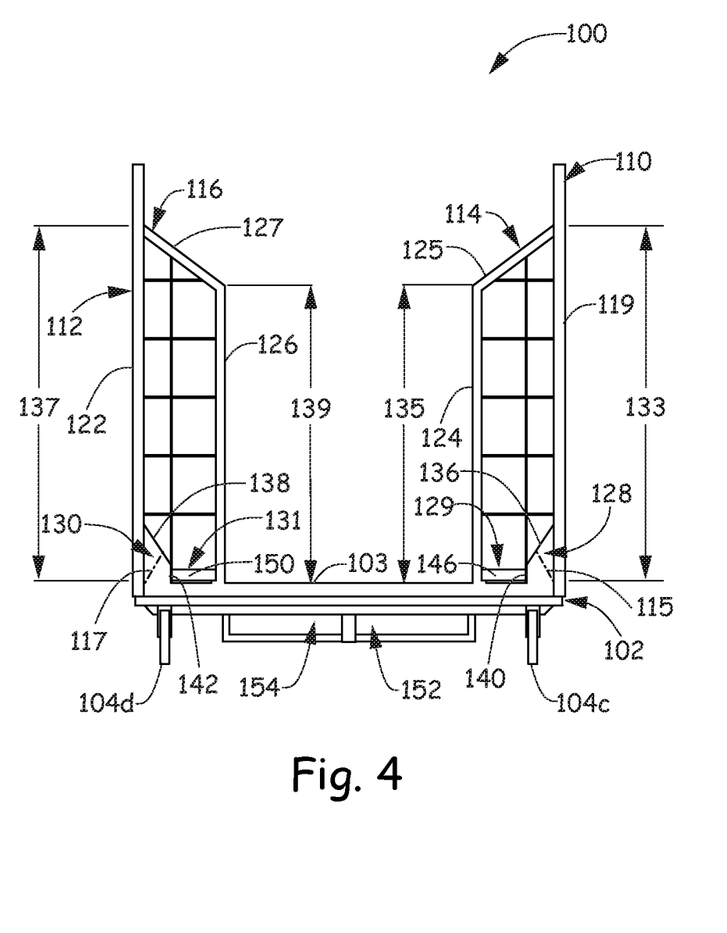
FIG. 4 is a back view of FIG. 1.
Figure 5:
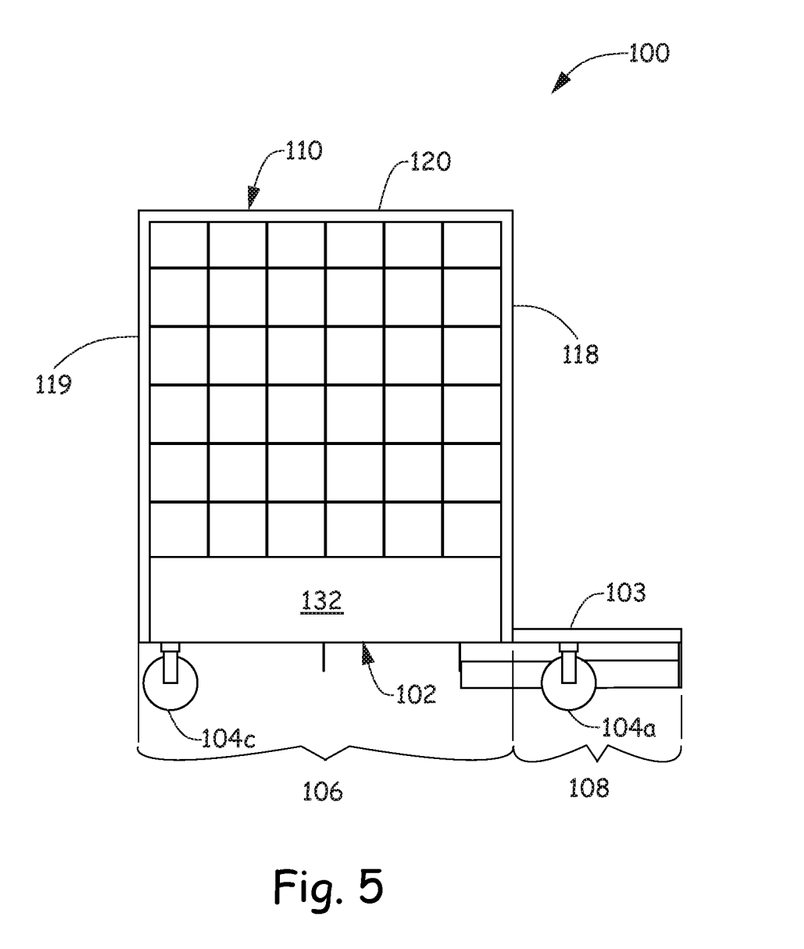
FIG. 5 is a left side view of FIG. 1.
Figure 6:
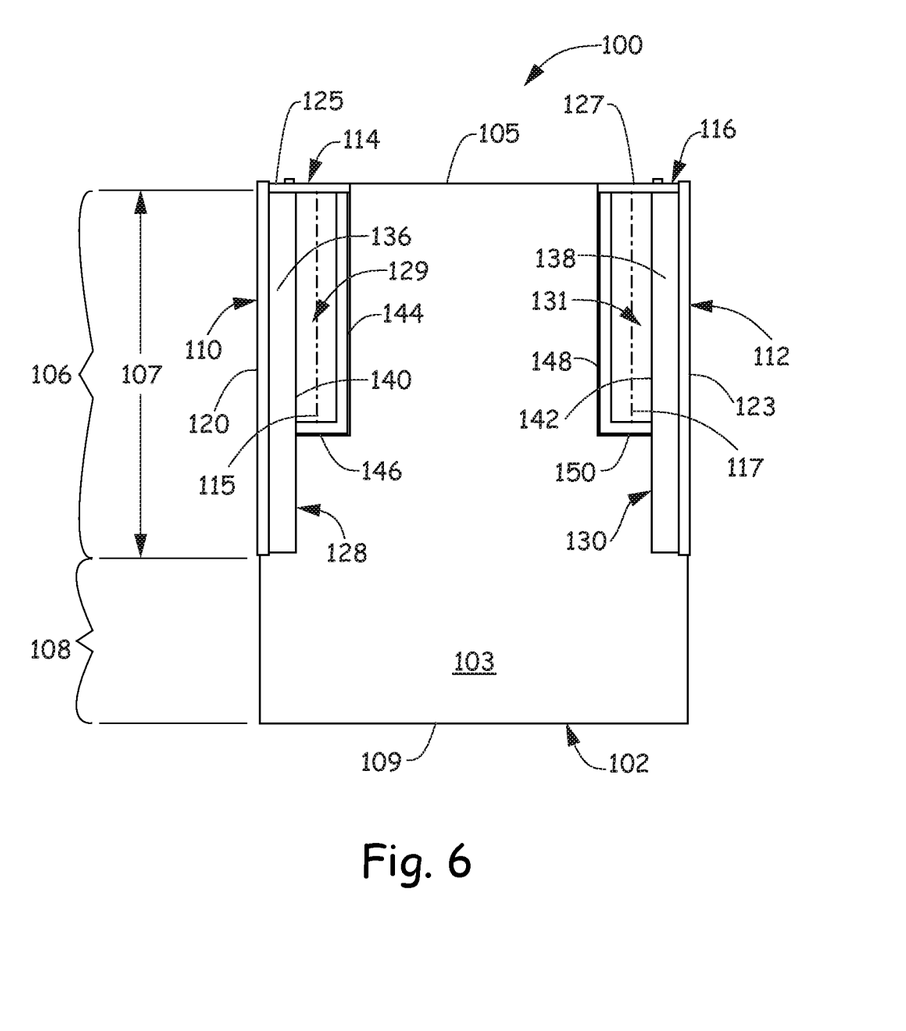
FIG. 6 is a top view of FIG. 1.

FIG. 1 is a front perspective view of a sled 100 configured to hold a shipping vessel. FIG. 2 is a back perspective view, FIG. 3 is a front view, FIG. 4 is a back view, FIG. 5 is a left side view and FIG. 6 is a top view of FIG. 1. Sled 100 includes a deck 102 supported by a plurality of wheels 104a-d, a cradle section 106 configured for receiving and holding a shipping vessel and a user workspace section 108. The plurality of wheels 104a-d are configured to provide sled 100 with rolling mobility on a floor. Cradle section 106 includes a length 107 (FIG. 6) that extends from a back 105 (FIG. 2) of deck 102 or sled 100 towards a front 109 (FIG. 1) of deck 102 or sled 100. User workspace section 108 is defined between cradle section 106 and front 109 of deck 102 or sled 100.

Sled 100 includes two side walls that define first and second sides of cradle section 106. A first side wall 110 is located on and is defined by a first side of cradle section 106 and includes a front frame member 118, a back frame member 119 that is substantially parallel to front frame member 118 and a top frame member 120 that is substantially parallel to top surface 103 of deck 102. A plurality of spaced apart interior wall members extend from front frame member 118 to back frame member 119 and a plurality of spaced apart interior wall members extend from top frame member 120 to a bottom of side wall 110 to form a lattice.

A second side wall 112 is located on and is defined by a second side of cradle section 106 and includes a front frame member 121, a back frame member 122 that is substantially parallel with front frame member 121 and a top frame member 123 that is substantially parallel with a top surface 103 of deck 102. A plurality of spaced apart interior wall members extend from front frame member 121 to back frame member 122 and a plurality of spaced apart interior wall members extend from top frame member 123 to a bottom of side wall 112 to form a lattice.

Sled 100 further includes a pair of back walls 114 and 116 that are spaced apart from each other to define portions of back 105 of cradle section 106. A left side of first back wall 114 is connected to back frame member 119 of first side wall 110 and is oriented substantially perpendicular to first side wall 110. First back wall 114 includes a right side frame member 124 that has a height that is less than any of frame members 118, 119, 121 and 122 and a top frame member 125 that extends from back frame member 119 to a top of right side frame member 124. Top frame member 125 is oriented at an angle relative to top surface 103 of deck 102 such that an outer portion is located a distance 133 (FIG. 4) from top surface 103 of deck 102 that is greater than a distance 135 (FIG. 4) that an opposing inner portion is located from top surface 103 of deck 102. A right side of second back wall 116 is connected to back frame member 122 of second side wall 112 and is oriented substantially perpendicular to second side wall 112. Second back wall 116 includes a left side frame member 126 that has a height that is less than any of frame members 118, 119, 121 and 122 and a top frame member 127 that extends from back frame member 122 to a top of left side frame member 126. Top frame member 127 is oriented at an angle relative to top surface 103 of deck 102 such that an outer portion is located a distance 137 (FIG. 4) from top surface 103 of deck 102 that is greater than a distance 139 (FIG. 4) that an opposing inner portion is located from top surface 103 of deck 102. In on embodiment, the relative angle of top frame member 125 to top surface 103 is substantially the same as the relative angle of top frame member 127 to top surface 103.

Like side walls 110 and 112, first back wall 114 includes a plurality of spaced apart interior wall members that extend from back frame member 119 to right side frame member 124 and a plurality of spaced apart interior wall members that extend from top frame member 125 to a bottom of back wall 114 to form a lattice. Second back wall 116 includes a plurality of spaced apart interior wall members that extend from back frame member 122 to left side frame member 126 and a plurality of spaced apart interior wall members that extend from top frame member 127 to a bottom of back wall 116 to form a lattice. The angled top frame members 125 and 127 and the space between back walls 114 and 116 will be discussed in detail below in regards to loading a shipping vessel in cradle section 106 of sled 100.

Sled 100 also includes a pair of wedges 128 and 130 and a pair of pockets 129 and 131 located in cradle section 106. First wedge 128 and second wedge 130 are substantially similar trapezoidal prisms each having surfaces that are oriented on deck 102 as mirror images of each other. First wedge 128 extends at least length 107 of cradle section 106 and includes an outer facing surface 132, an upper facing surface 136, an inner facing surface 140, a front facing surface and a back facing surface. In the illustrated embodiment, outer facing surface 132 of first wedge 128 aligns with the entire length of first side wall 110 and therefore length 107 of cradle section 106 so that outer facing surface 132 defines the first side of cradle section 106 and provides a bottom portion of first side wall 110. Second wedge 130 includes an outer facing surface 134, an upper facing surface 138, an inner facing surface 142, a front facing surface and a back facing surface. In the illustrated embodiment, outer facing surface 134 of second wedge 130 aligns with the entire length of second side wall 112 and therefore length 107 of cradle section 106 so that outer facing surface 134 defines the second side of cradle section 106 and provides a bottom portion of second side wall 112. In particular, the lattice formed by the plurality of spaced apart interior wall members of first and second side walls 110 and 112 terminate at the top of outer facing surfaces 132 and 134 of first and second wedges 128 and 130, respectively.

Like top frame members 125 and 127, upper facing surfaces 136 and 138 of first and second wedges 128 and 130, respectively, are oriented at an angle relative to top surface 103 of deck 102. Upper facing surface 136 of front wedge 128 slopes downwardly from an outer edge 135 to an opposing inner edge 137. Upper facing surface 138 of second wedge 130 slopes downwardly from an outer edge 139 to an opposing inner edge 141. Wedges 128 and 130 are hollow and each include an interior support plate 115 and 117, respectively. Support plate 115 in wedge 128 extends from the intersection of outer facing surface 132 and top surface 103 of deck 102 to upper facing surface 136 and for the entire length of wedge 128. Support plate 117 in wedge 130 extends from the intersection of outer facing surface 134 and top surface 103 of deck 102 to upper facing surface 138 and for the entire length of wedge 130. Support plates 115 and 117 provide structural integrity to the sloping upper facing surfaces 136 and 138 so as to keep surfaces 136 and 138 from denting when coming into contact with a shipping vessel.

The front and rear facing surfaces of first and second wedges 128 and 130 face the front and rear of sled 100, respectively, while a portion of inner facing surfaces 140 and 142 of first and second wedges 128 and 130 define a side of each of the pair of pockets 129 and 131. In the illustrated embodiment, first pocket 129 is defined on its left side by inner facing surface 140 of first wedge 128, on its right side by an opposing lengthwise rail 144, at its front by a front rail 146 and at its back by a back edge of deck 102 and therefore first back wall 114. Second pocket 131 is spaced apart from first pocket 129 and is defined by inner facing surface 142 of second wedge 130 on its right side, by an opposing lengthwise rail 148 on its left side, by a front rail 150 at its front and by a back edge of deck 102 and therefore second back wall 116 at its back.

A forklift having a pair of forks carries a shipping vessel to sled 100 and loads or places the shipping vessel into sled 100. In one embodiment, the forklift may load the shipping vessel on sled 100 from back 105 of sled 100 where back walls 114 and 116 are located. Back walls 114 and 116 are spaced apart from each other to accommodate the forks of the forklift when the forks lower the shipping vessel onto deck 102 of sled 100. Together angled top frame members 125 and 127 of respective back walls 114 and 116, the angled upper facing surfaces 136 and 138 of respective first and second wedges 128 and 130 and pockets 129 and 131 aid the forklift in loading or placing a shipping vessel in the cradle section 106 of deck 102. In particular, angled top frame members 125 and 127 prevent the forklift from damaging back walls 114 and 116. The forks may hit back walls 114 and 116, but they will be guided by and glance off of angled top frame members 125 and 127. Angled upper facing surfaces 136 and 138 of respective wedges 128 and 130 direct the shipping vessel loaded on the forklift into the center of deck 120 while first and second pockets 129 and 131 provide an area for the shipping vessel to sit. In another embodiment, a forklift may load the shipping vessel on sled 100 from front 109 of sled 100. In this embodiment, the forklift would need to have an extendable/retractable mast and would utilize angled upper facing surface 136 and 138 of respective wedges 128 and 130 to direct the shipping vessel into the center of deck 120.

Figure 7:
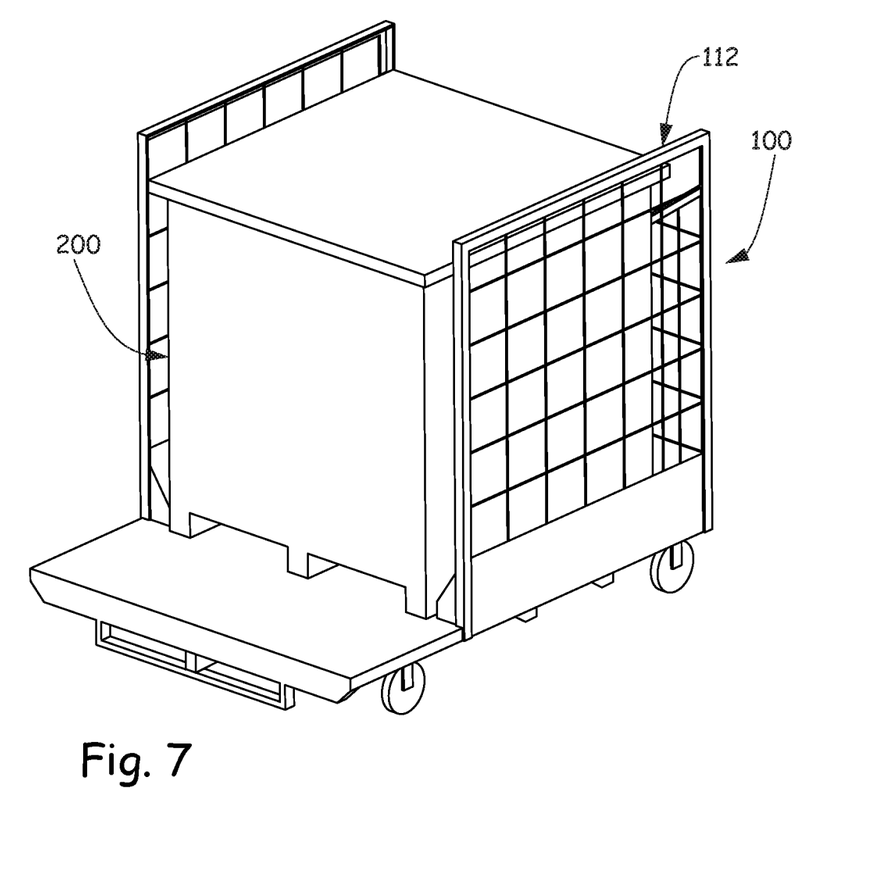
FIG. 7 is a front perspective view of a sled holding a shipping vessel.
Figure 8:
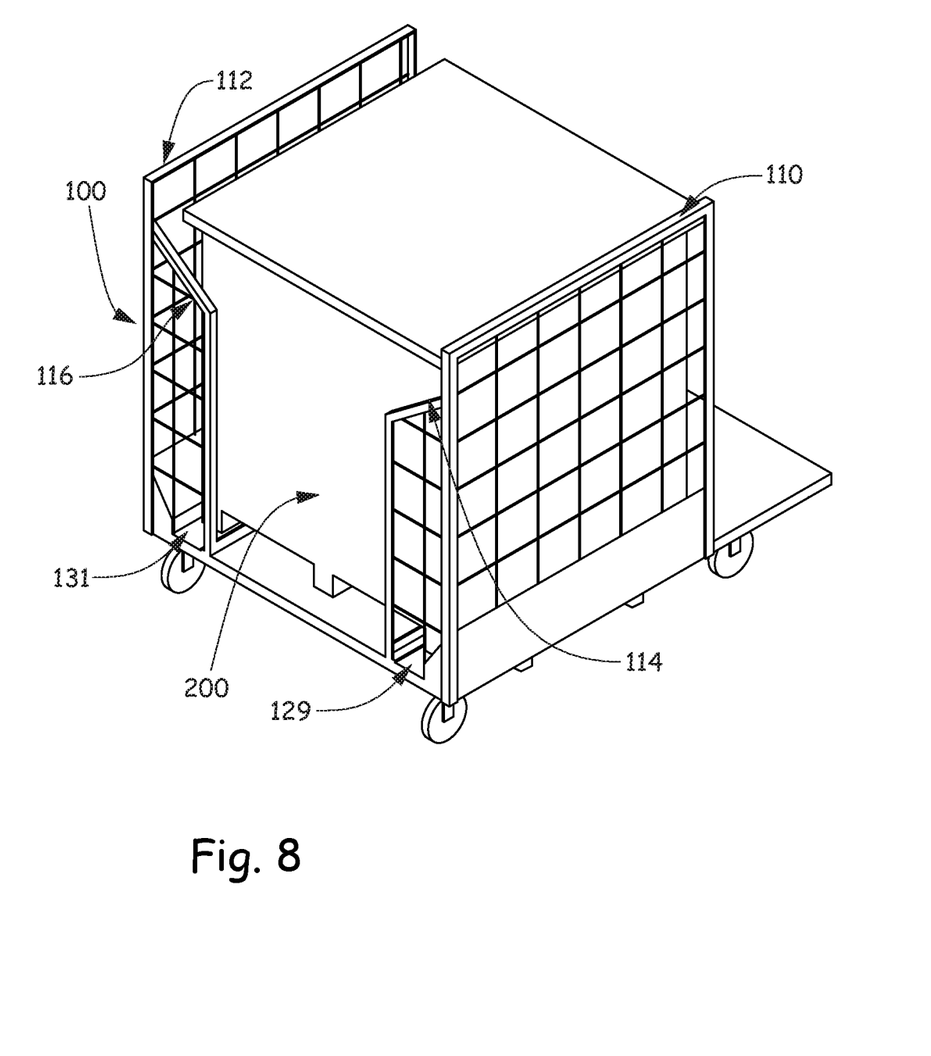
FIG. 8 is a back perspective view of FIG. 7.
Figure 9:
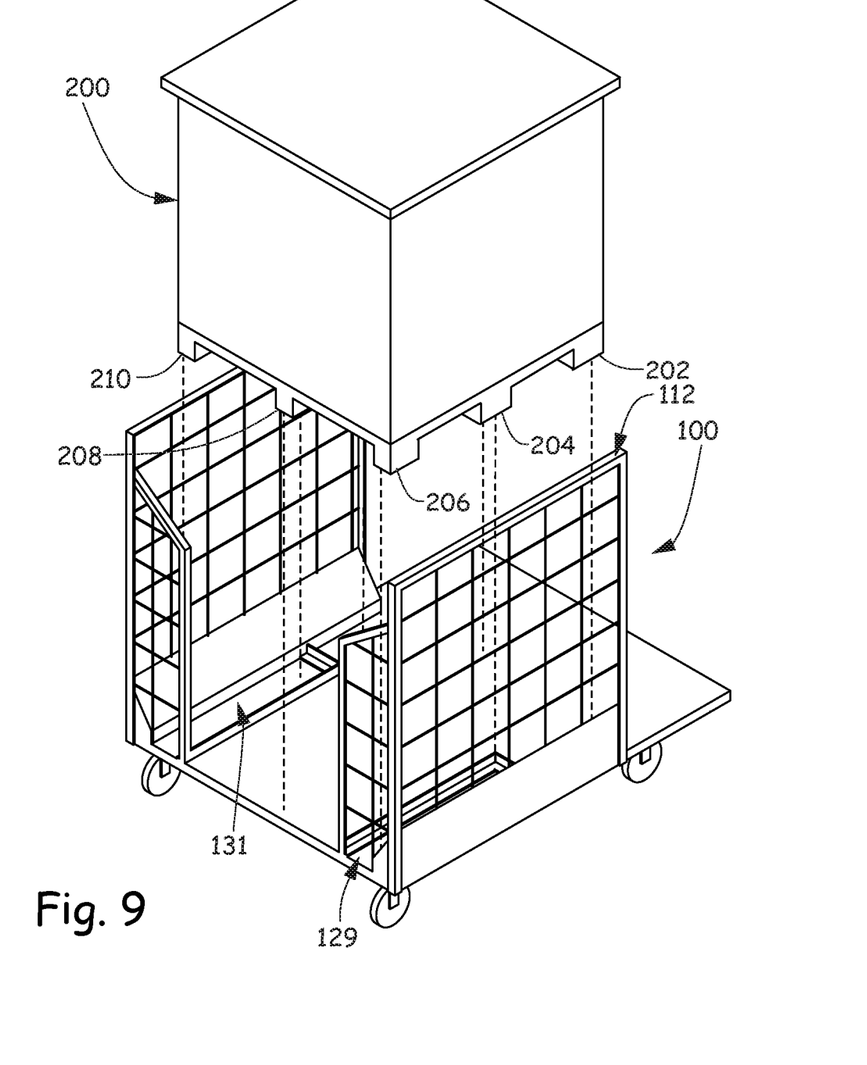
FIG. 9 is a back perspective view of the sled of FIGS. 7 and 8 with the shipping vessel exploded from the sled.

FIG. 7 is a front perspective view of sled 100 holding a shipping vessel 200. FIG. 8 is a back perspective view of FIG. 7. FIG. 9 is a back perspective view of sled 100 with shipping vessel 200 exploded from sled 100. As illustrated, shipping vessel 200 fits inside cradle section 106 and includes a plurality of feet. In the illustrated embodiment, shipping vessel 200 includes nine feet with five feet 202, 204, 206, 208 and 210 shown in FIG. 9. First and second pockets 129 and 131 are configured to stabilize four of the nine feet. Two of the feet 204 and 206 fit inside first pocket 129 and the other two of the feet (210 and the other hidden from view) fit inside second pocket 131. In this way, shipping vessel 200 is securely cradled in cradle section 106. As also illustrated in FIGS. 7-9, side walls 110 and 112 provide a rigid exoskeleton for shipping vessel 200 so that the shipping vessel 200 is not crushed by, for example, people leaning against shipping vessel 200.

With reference back to FIGS. 1 and 3-5, on front 109 of sled 100 or, in other words, opposite of where a forklift loads or places the shipping vessel into sled 100, are features for receiving forks of an order picker. In particular, sled 100 includes a first slot 152, a second slot 154 and a divider 156, which are all located underneath deck 102 and connected to an underside of deck 102. For example, divider 156 may be a piece of wood, such as a 2×4 board. Divider 156 allows the order picker to safely attach to the sled 100.

Figure 10:
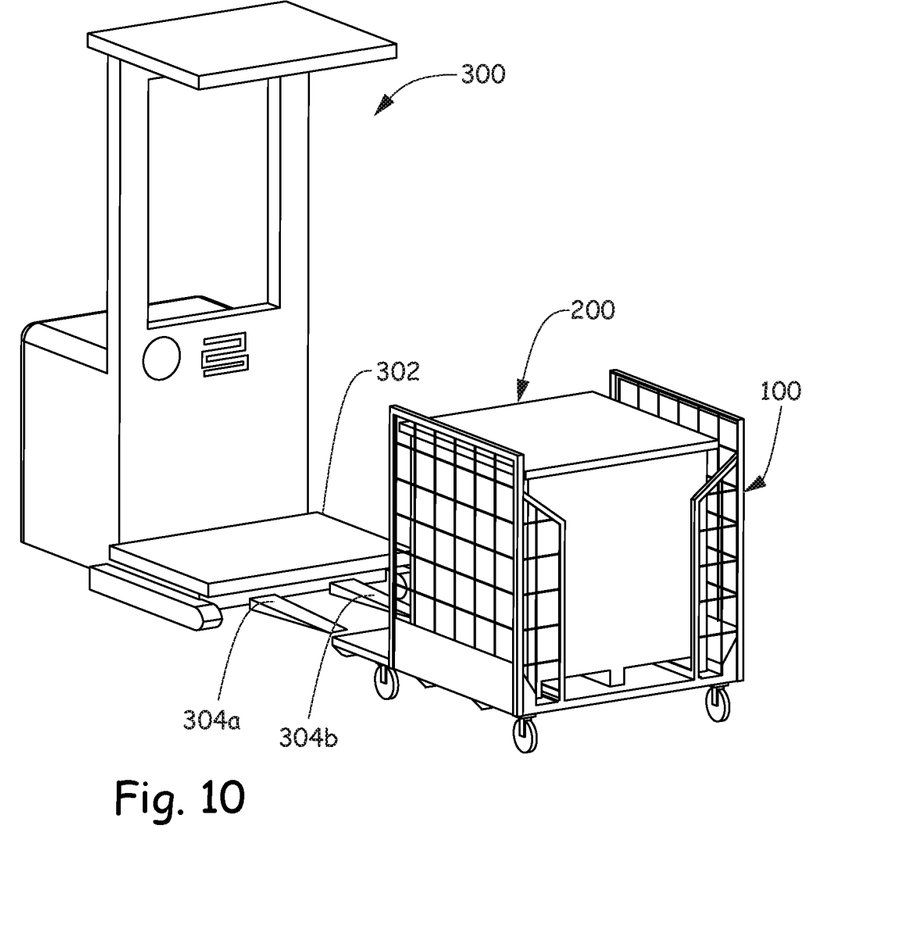
FIG. 10 is a perspective view of an order picker configured to mate with the sled holding a shipping vessel so as to raise the sled and the shipping vessel into the air.

FIG. 10 is a perspective view of an order picker 300 configured to mate with sled 100, which is holding shipping vessel 200 so as to raise and lower sled 100 and shipping vessel 200 into the air. Order picker 300 is a piece of equipment used to pick and deliver material needed for filling orders from storage. In FIG. 10, order picker 300 is a lift machine designed for filling orders which require piece-part or case picking, rather than full pallets or unit loads. Order picker 300 is used at elevations greater than the first level of racking in a warehouse and provides a more versatile design for handling different kinds of items and also provides faster travel time, lift and lower speeds and ease of maneuverability, which all increase the efficiency of order picking.

A user of order picker 300 stands on the order picker deck 302 and moves the order picker 300 to mate forks 304a and 304b with first and second slots 152 and 154, therefore attaching to sled 100. Once forks 304a and 304b are locked to sled 100, order picker 300 lifts sled 100 and shipping vessel 200 into the air to a location adjacent to a rack. Once in the correct location, deck 302 receives the user from order picker 300 onto user workspace section 108 of deck 102 to pick or place inventory to and from shipping vessel 200. In this way, sled 100 provides a way to transport shipping vessel 200 around with minimal touches on the materials inside shipping vessel 200. At the warehouse, shipping vessel 200 is pulled off the trailer truck with a forklift and then placed and cradled directly onto sled 100. Sled 100 is moved around by order picker 300 into a position for unloading material inside shipping vessel 200 that has yet to be touched. In another embodiment, shipping vessel is filled with material as it is cradled by sled 100. Sled is moved by order picker 300 into a position where a forklift can then lift and place shipping vessel 200 into a trailer truck for transport. Again, sled 100 provides a way to transport shipping vessel around 200 with minimal touches on the materials inside shipping vessel 200.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A sled configured to hold a shipping vessel, the sled comprising:
   a deck including a top surface and a cradle section configured to hold a shipping vessel, the cradle section having a length that extends from a back of the deck towards a front of the deck;
   a first back wall that defines a portion of a back of the cradle section;
   a second back wall spaced apart from the first back wall that defines a portion of the back of the cradle section;
   a first wedge extending at least the length of the cradle section and including at least an outer facing surface and an upper facing surface, wherein the outer facing surface of the first wedge defines a first side of the cradle section of the sled;
   a second wedge spaced apart from the first wedge, extending at least the length of the cradle section and including at least an outer facing surface and an upper facing surface, wherein the outer facing surface of the second wedge defines a second side of the cradle section of the sled;

wherein the upper facing surface of the first wedge is oriented at an angle relative to the top surface of the deck such that the upper facing surface of the first wedge slopes downwardly from an outer edge of the upper facing surface of the first wedge to an opposing inner edge of the upper facing surface of the first wedge; and wherein the upper facing surface of the second wedge is oriented at an angle relative to the top surface of the deck such that the upper facing surface of the second wedge slopes downwardly from an outer edge of the upper facing surface of the second wedge to an opposing inner edge of the upper facing surface of the second wedge.

2. The sled of claim 1, wherein a top of the first back wall is oriented at an angle relative to the top surface of the deck such that an outer portion is located a distance from the top surface of the deck that is greater than a distance that an opposing inner portion is located from the top surface of the deck and wherein a top of the second back wall is oriented at an angle relative to the top surface of the deck such that an outer portion of the top of the second back wall is located a distance from the top surface of the deck that is greater than distance that an opposing inner portion of the top of the second back wall is located from the top surface of the deck.

3. The sled of claim 1, further comprising:
a first side wall that further defines the first side of the cradle section, wherein the first side wall is connected to the first back wall; and
a second side wall that further defines the second side of the cradle section, wherein the second side wall is connected to the second back wall.

4. The sled of claim 3, wherein the first side wall, the second side wall, the first back wall and the second back wall comprise interior wall members that form a lattice.

5. The sled of claim 1, further comprising:
a first pocket located in the cradle section on the deck of the sled and defined at least by an inner facing surface of the first wedge;
a second pocket spaced apart from the first pocket, located in the cradle section of the deck and defined at least by an inner facing surface of the second wedge; and
wherein the first pocket and the second pocket are configured to receive and stabilize feet of the shipping vessel.

6. The sled of claim 1, further comprising a plurality of wheels mounted to a bottom of the deck so that the sled is configured to be mobile along a floor.

7. The sled of claim 1, further comprising a user workspace section, wherein a back of the user workspace section is defined by the cradle section and a front of the user workspace is defined by a front of the sled.

8. A sled comprising:
a deck having a back, a front, opposing first and second sides and configured to hold a shipping vessel;
two back walls located at the back of the deck and spaced apart from each other for accommodating forks of a forklift, wherein the two back walls have tops that slope at an angle downwardly and inwardly from first sides of the back walls located at the opposing first and second sides of the deck to second sides of the back walls, the slopes of the tops of the backs walls being less than 90 degrees relative to the deck; and
a pair of wedges each located on the opposing sides of the deck and having at least outer facing surfaces and upper facing surfaces, wherein the outer facing surfaces define each of the first and second sides of the deck and wherein the upper facing surfaces slope downwardly and inwardly towards the deck and are configured to guide and center the shipping vessel onto the deck, the slopes of the upper facing surfaces of the pair of wedges being less than 90 degrees relative to the deck.

9. The sled of claim 8, wherein the tops of the two back walls are oriented at angles relative to a top surface of the deck, wherein the tops of the two back walls are configured to guide forks of the forklift into a center of the deck.

10. The sled of claim 8, further comprising a first pocket located in a cradle section on the deck of the sled and defined at least by an inner facing surface of a first wedge of the pair of wedges and a second pocket spaced apart from the first pocket, and wherein the sled includes a second pocket located in the cradle section of the deck and defined at least by an inner facing surface of a second wedge of the pair of wedges, the first pocket and the second pocket receiving and stabilizing feet of the shipping vessel.

11. The sled of claim 8, further comprising a user workspace configured to receive a user that accesses inventory in the shipping vessel.

12. A sled configured to hold a shipping vessel, the sled comprising:
a deck including a top surface and a cradle section configured to hold a shipping vessel, the cradle section having a length that extends from a back of the deck towards a front of the deck;
a first wedge extending at least the length of the cradle section and including at least an outer facing surface and an upper facing surface, wherein the outer facing surface of the first wedge defines a first side of the cradle section of the sled;
a second wedge spaced apart from the first wedge, extending at least the length of the cradle section and including at least an outer facing surface and an upper facing surface, wherein the outer facing surface of the second wedge defines a second side of the cradle section of the sled;
a first pocket located in the cradle section on the deck of the sled and defined at least by an inner facing surface of the first wedge;
a second pocket spaced apart from the first pocket, located in the cradle section of the deck and defined at least by an inner facing surface of the second wedge, wherein the first pocket and the second pocket are configured to receive and stabilize feet of the shipping vessel;
wherein the upper facing surface of the first wedge is oriented at an angle relative to the top surface of the deck such that the upper facing surface of the first wedge slopes downwardly from an outer edge of the upper facing surface of the first wedge to an opposing inner edge of the upper facing surface of the first wedge; and
wherein the upper facing surface of the second wedge is oriented at an angle relative to the top surface of the deck such that the upper facing surface of the second wedge slopes downwardly from an outer edge of the upper facing surface of the second wedge to an opposing inner edge of the upper facing surface of the second wedge.

13. The sled of claim 12, further comprising:
a first back wall that defines a portion of a back of the cradle section; and
a second back wall spaced apart from the first back wall that defines a portion of the back of the cradle section.

14. The sled of claim 13, wherein a top of the first back wall is oriented at an angle relative to the top surface of the deck such that an outer portion is located a distance from the top surface of the deck that is greater than a distance that an opposing inner portion is located from the top surface of the deck and wherein a top of the second back wall is oriented at an angle relative to the top surface of the deck such that an outer portion is located a distance from the top surface of the deck that is greater than a distance that an opposing inner portion is located from the top surface of the deck.

15. The sled of claim 13, further comprising:
  a first side wall that defines the first side of the cradle section, wherein the first side wall is connected to the first back wall; and
  a second side wall that defines the second side of the cradle section, wherein the second side wall is connected to the second back wall.

16. The sled of claim 15, wherein the first side wall, the second side wall, the first back wall and the second back wall comprise interior wall members that form a lattice.

17. The sled of claim 12, wherein the upper facing surface of the first wedge is oriented at an angle relative to the top surface of the deck such that the upper facing surface of the first wedge slopes downwardly from an outer edge of the upper facing surface of the first wedge to an opposing inner edge of the upper facing surface of the first wedge and wherein the upper facing surface of the second wedge is oriented at an angle relative to the top surface of the deck such that the upper facing surface of the second wedge slopes downwardly from an outer edge of the upper facing surface of the second wedge to an opposing inner edge of the upper facing surface of the second wedge.

18. The sled of claim 12, further comprising a plurality of wheels mounted to a bottom of the deck so that the sled is configured to be mobile along a floor.

19. The sled of claim 12, further comprising a user workspace section, wherein a back of the user workspace section is defined by the cradle section and a front of the user workspace is defined by a front of the sled.

* * * * *